United States Patent
Son et al.

(10) Patent No.: US 7,894,771 B2
(45) Date of Patent: Feb. 22, 2011

(54) METHOD FOR SELECTING DESIRED ITEM INFORMATION IN MOBILE TERMINAL

(75) Inventors: Myung-Hee Son, Daejon (KR);
Yong-Joon Lee, Daejon (KR);
Cheol-Sig Pyo, Daejon (KR)

(73) Assignee: Electronics and Telecommunciations Research Institute, Daejon (KR)

( * ) Notice: Subject to any disclaimer, the term of this patent is extended or adjusted under 35 U.S.C. 154(b) by 838 days.

(21) Appl. No.: 11/507,269

(22) Filed: Aug. 21, 2006

(65) Prior Publication Data

US 2007/0080785 A1    Apr. 12, 2007

(30) Foreign Application Priority Data

Oct. 10, 2005   (KR) ............... 10-2005-0095064
Dec. 15, 2005   (KR) ............... 10-2005-0123815

(51) Int. Cl.
*H04W 88/02* (2009.01)
(52) U.S. Cl. .................... 455/41.3; 455/41.2
(58) Field of Classification Search ........... 455/41.3, 455/41.2, 456.3, 553.1, 566, 574; 37/338
See application file for complete search history.

(56) References Cited

U.S. PATENT DOCUMENTS

| | | | |
|---|---|---|---|
| 6,195,006 B1 | 2/2001 | Bowers et al. | |
| 6,892,052 B2 * | 5/2005 | Kotola et al. | ............... 455/41.2 |
| 7,072,672 B1 * | 7/2006 | Vanska et al. | ............ 455/456.3 |
| 7,145,437 B2 * | 12/2006 | Jalkanen et al. | ............ 340/10.3 |
| 7,274,909 B2 * | 9/2007 | Perttila et al. | ............... 455/41.2 |
| 7,493,082 B2 * | 2/2009 | Perttila | ....................... 455/41.2 |
| 2002/0170961 A1 | 11/2002 | Dickson et al. | |
| 2002/0174025 A1 | 11/2002 | Hind et al. | |
| 2004/0002846 A1 * | 1/2004 | Lutz et al. | ...................... 703/19 |
| 2004/0010446 A1 * | 1/2004 | Vanska et al. | .................. 705/14 |
| 2005/0181821 A1 * | 8/2005 | Elomaa | .................... 455/550.1 |
| 2006/0022038 A1 * | 2/2006 | Hewlin et al. | ................ 235/385 |
| 2006/0071778 A1 * | 4/2006 | Vesikivi et al. | ............ 340/539.1 |
| 2006/0205394 A1 * | 9/2006 | Vesterinen | .................. 455/418 |
| 2007/0298843 A1 * | 12/2007 | Kwon | .......................... 455/566 |

FOREIGN PATENT DOCUMENTS

| | | |
|---|---|---|
| JP | 2005-149152 | 6/2005 |
| JP | 2005-182672 A | 7/2005 |
| JP | 2005-257378 A | 9/2005 |
| JP | 2005-269295 A | 9/2005 |
| KR | 1020040078636 A | 4/2004 |
| KR | 10-2005-0089657 | 9/2005 |
| KR | 1020060088423 A | 8/2006 |

* cited by examiner

*Primary Examiner*—Diane Mizrahi
(74) *Attorney, Agent, or Firm*—Ladas & Parry LLP

(57) ABSTRACT

Provided is a method for selecting only desired item information in a mobile terminal. The method includes the steps of: a) setting up an item category desired and selected by a user in the mobile terminal; b) reading item information stored in tags attached to items with a Radio Frequency Identification (RFID) reader loaded in the mobile terminal; and c) performing filtering and displaying only the item information of an item that belongs to the selected item category among the item information acquired by the RFID reader of the mobile terminal.

6 Claims, 4 Drawing Sheets

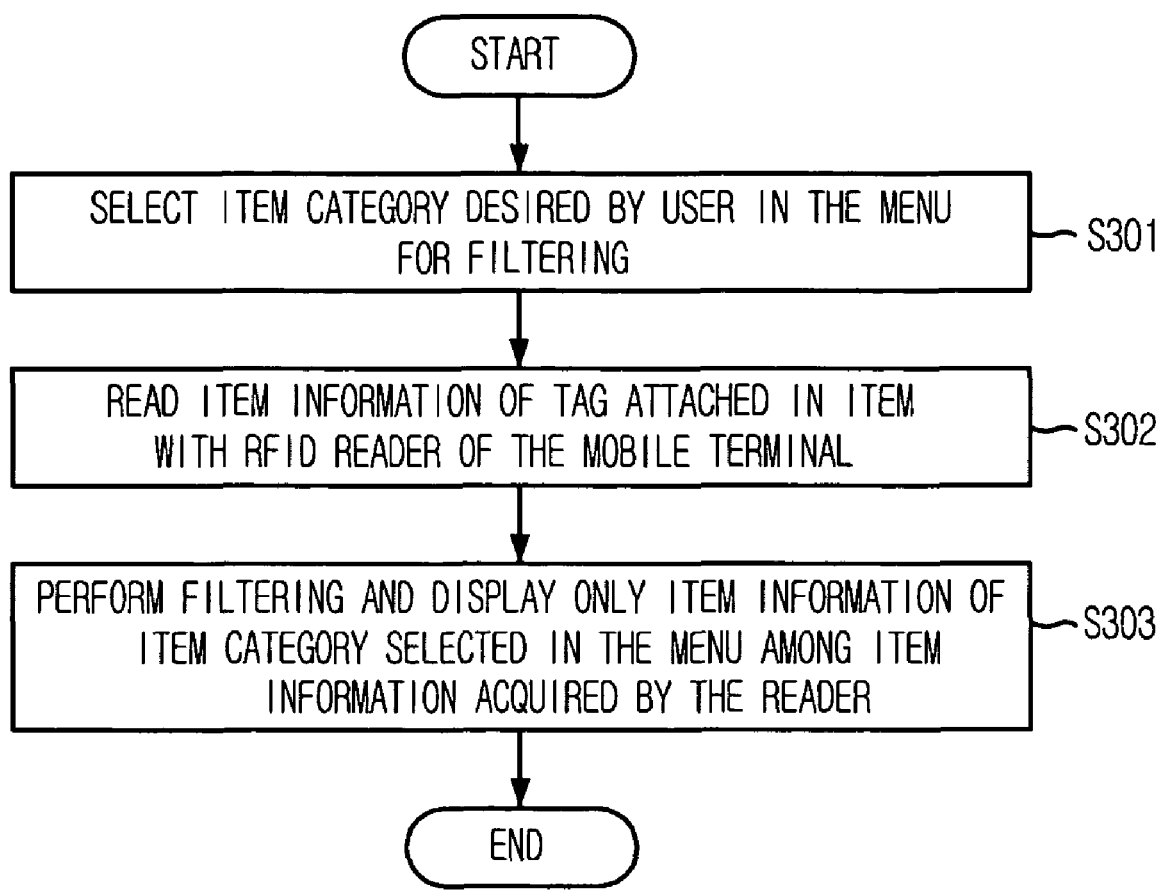

METHOD FOR SELECTING DESIRED ITEM INFORMATION IN MOBILE TERMINAL

FIELD OF THE INVENTION

The present invention relates to a method for selecting desired item information in a mobile terminal; and, more particularly, to a method for selecting only desired item information providing a mapping table for categorizing items in the mobile terminal, preparing a menu for selecting a category of a desired item such as shoes and jeans before operating a Radio Frequency Identification (RFID) reader, and which filtering and displaying only a category of the desired item.

DESCRIPTION OF RELATED ART

In the present invention, a mobile terminal is a portable electronic device such as a mobile phone, a Personal Digital Assistant (PDA), a portable multimedia player (PMP), Moving Picture Experts Group (MPEG) Audio Layer-3 (MP3) player with a Radio Frequency Identification (RFID) reader mounted therein. The mobile terminal can be independently used as an RFID reader.

When the RFID reader in the mobile terminal reads item information in a form of bit string stored in a tag attached to an item, the acquired item information of the bit string form is transformed into an item category, which is an item name such as a refrigerator, based on a mapping table and only item information corresponding to a pre-selected item category is filtered out. The above process is item information filtering, i.e., category filtering of an item, in the present invention.

Related arts include KR Patent Publication No. 2005-0089657 (reference 1), published on Sep. 8, 2005, disclosing a mobile communication terminal having an RFID tag reading function and a network system connected to the mobile communication terminal, which can easily acquire and use item information by mounting a tag antenna in one side of the mobile communication terminal and displaying tag information transmitted from the antenna in a display panel of the mobile communication terminal. In the reference 1, an antenna capable of receiving tag information is mounted in a mobile communication terminal having an RFID tag reading function and a frequency signal corresponding to a resonant frequency of the tag is provided to the antenna. Also, the mobile communication terminal of the reference 1 receives the item information from the tag or additional item information from an item information provider through a wired/wireless communication network, and displays it in the display panel of the mobile communication terminal.

According to the reference 1 or other similar related arts, when the RFID reader in the mobile terminal reads item information desired by a user in a performance poster attached to a department store, a bookstore or a bulletin board, the RFID reader reads information of all tags within a coverage that the mobile terminal can read as well as the desired item information. Therefore, a user has to search again all the displayed item information to find the desired item information. Since the method requires much time for acquiring the desired item information especially when there are a variety of items, it is difficult to use the method.

SUMMARY OF THE INVENTION

It is, therefore, an object of the present invention to provide a method for selecting desired item information providing a mapping table for categorizing items in the mobile terminal, preparing a menu for selecting a category of a desired item such as shoes and jeans before operating a Radio Frequency Identification (RFID) reader, and which filtering and displaying only a category of the desired item.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a method for selecting only desired item information in a mobile terminal, the method including the steps of: a) setting up an item category desired and selected by a user in the mobile terminal; b) reading item information stored in tags attached to items with the RFID reader loaded in the mobile terminal; and c) performing filtering and displaying only the item information of an item that belongs to the selected item category among the item information acquired by the RFID reader of the mobile terminal.

In accordance with another aspect of the present invention, there is provided a method for selecting only desired item information in a mobile terminal, the method including the steps of: a) reading item information stored in tags attached to items with the RFID reader loaded in the mobile terminal; b) setting up an item category desired and selected by the user; and c) performing filtering and displaying only item information corresponding to the selected item category among the item information acquired by the RFID reader of the mobile terminal.

The mobile terminal of the present invention is equipped with a mapping table for each categorizing items, i.e., an item name, and prepares a menu for selecting the category of the item desired by the user before the RFID reader is operated. When the user selects the category of the desired item in the menu and then operates the RFID reader, the mobile terminal can acquire only the information on the selected category from a nearby tag.

In short, the present invention can filter and display only the category of the item selected by the user by providing the mapping table categorizing items in the mobile terminal, and providing the menu for selecting the item category desired by the user before operating the RFID reader.

BRIEF DESCRIPTION OF THE DRAWINGS

The above and other objects and features of the present invention will become apparent from the following description of the preferred embodiments given in conjunction with the accompanying drawings, in which:

FIG. 3 is a flowchart describing a method for selecting only desired item information in the mobile terminal in accordance with an embodiment of the present invention.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

For example, 44 bits are allocated to manufacturing company information and item information in a Radio Frequency Identification (RFID) tag attached to an item using "EPC SGTIN-96 code". Also, 38 bits are allocated to a serial number. An RFID reader of a mobile terminal reads item code information from the tag in bit strings and recognizes the category of an item, i.e., an item name, from the mapping table mapping codes to item category in the mobile terminal.

To put it in detail, a result that the RFID reader of the mobile terminal recognizes multiple codes from the tag is a value of a bit string. Therefore, when the bit string is directly displayed in the mobile terminal, a user cannot understand the number. Therefore, the mobile terminal includes the mapping table to show the numbers, i.e., the bit string value, in the form of item information. Herein, the mapping table can be basically realized to be able to show item information, i.e., item name such as a refrigerator, and detailed information of the item. That is, a structure of the mapping table can be basically realized as {code: item name}, or {code: item name: detailed information} by adding a detailed information field.

Since there are many kinds of items with an area in a place where the items are arranged to be shown to their customers such as a department store, the mobile terminal reads item information of other tags. i.e., item information of diverse categories, within a reading coverage of the mobile terminal as well as item information desired by a user. Accordingly, it is required to filter the item information and display only desired item information.

According to the present invention, the mobile terminal can instantly display item information corresponding to a recognized code by having a mapping table categorizing the items. Also, it prepares a menu such that a user can select an item category desired by the user such as "shoes" or "jeans" before operating the RFID reader. When the user selects an item in the menu, the mobile terminal displays only item information of the item category selected by the user by filtering out other item information except the item information in the item category selected in the menu. The process will be described in detail hereinafter with reference to FIGS. 1 to 3.

Figure 1:
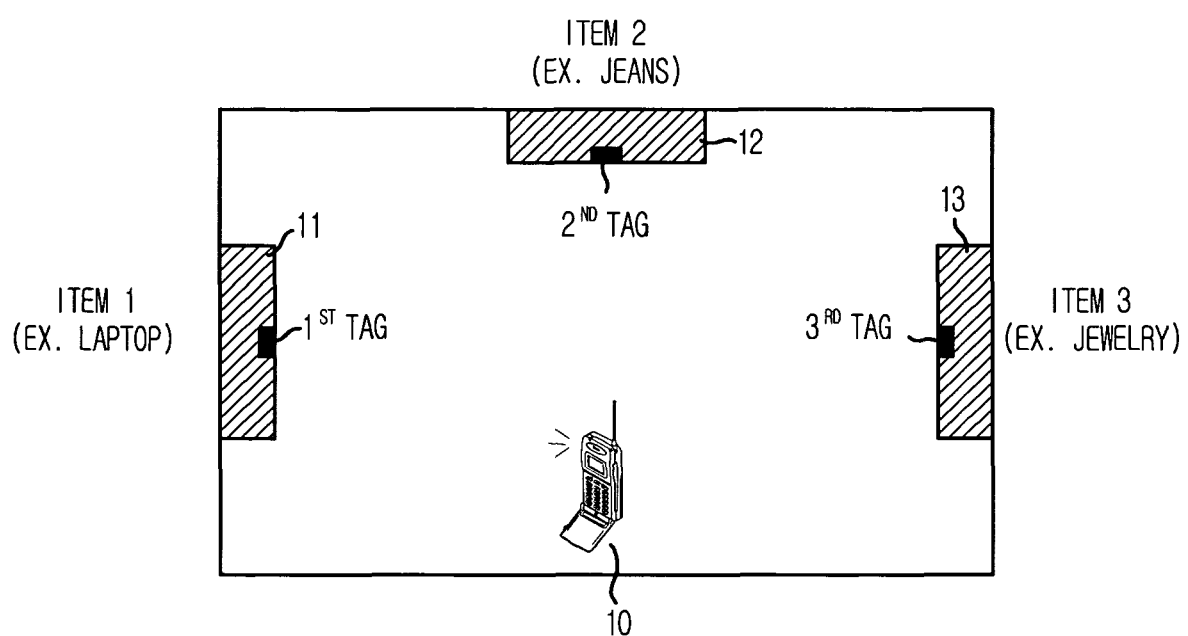
FIG. 1 shows a method for filtering and reading only desired item information in a mobile terminal in accordance with an embodiment of the present invention.

FIG. 1 shows a method for filtering and reading only desired item information in a mobile terminal in accordance with an embodiment of the present invention.

When there are an item 1 with a first tag 11 attached thereto, an item 2 with a second tag 12 and an item 3 with a third tag 13 in a specific space, such as a store, within a range that a mobile terminal 10 having an RFID reader can recognize tags and the user enters the specific space with the mobile terminal 10 after selecting item information desired to be displayed, e.g., jeans, the mobile terminal 10 displays only the item information of the item category selected by the user, e.g., the item information on the jeans, by performing filtering on the acquired item information, e.g., a notebook, blue jeans and jewelry, acquired from the tags within the recognizable range. During the filtering, only the item information corresponding to the category of the item, e.g., the jeans, selected in the menu, and the item information of the other item categories, e.g., the notebook and the jewelry are excluded.

That is, the mobile terminal 10 reads the item information from the tags attached to the items within the range that the RFID reader of the mobile terminal can recognize, and displays only the item information selected to be displayed by the user.

To take another example, the user can acquire only the desired store information among store informations stored in RFID tags attached to the shoes in a shopping mall. That is, when the user looks for a shoes store such as "Kumkang Shoes", it is possible not to display information of other stores except information including a location of the "Kumkang shoes" and prices of products sold in the "Kumkang shoes" in the mobile terminal by filtering out informations of other stores.

Figure 2A:
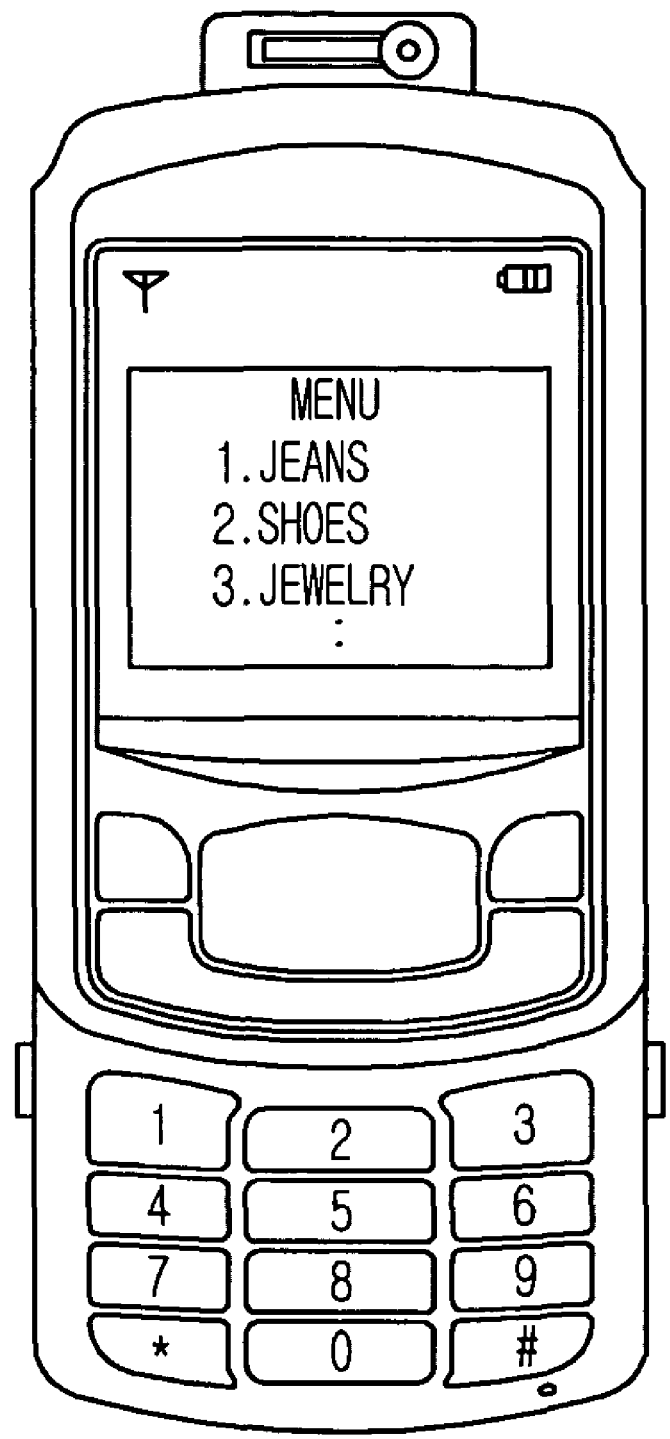
FIGS. 2A and 2B illustrates item information displayed in the mobile terminal in accordance with the embodiment of the present invention.
Figure 2B:
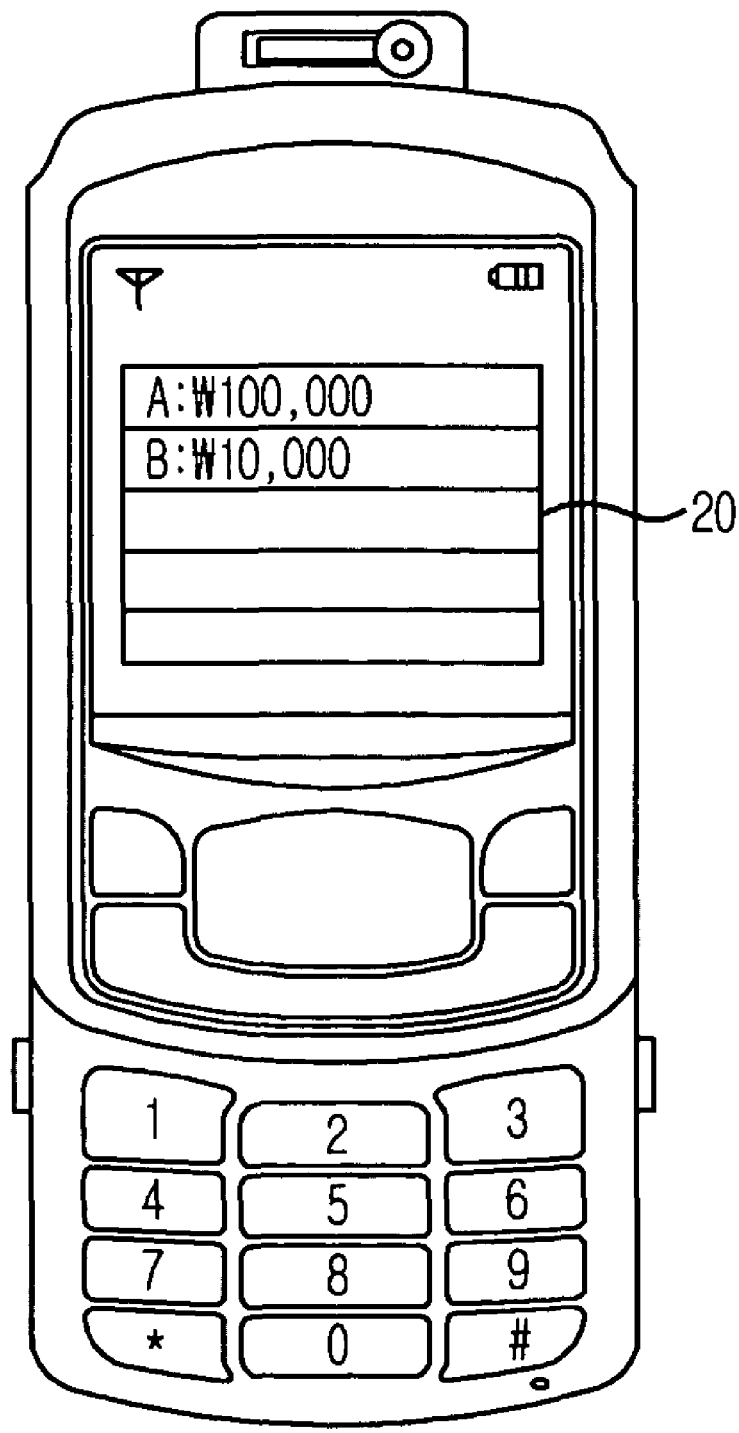

FIGS. 2A and 2B shows item information displayed in the mobile terminal in accordance with an embodiment of the present invention.

Categories of items which is available in the menu before the mobile terminal is operated by the user may include "shoes", "jeans", "necklace" and "handkerchief" based on the kind of items, "Levi's" and "Kumkang shoes" based on the manufacturing company of items, or "formal shoes" and "casual shoes" based on the detailed kind of item.

When a desired item is arranged together with items of another category, the user can separate the desired items from the other items and acquire the item information by selecting only the category in the menu.

It is also possible to continuously select a category and a manufacturing company in the menu to read the information of desired shoes in a shoes store providing diverse brands of shoes.

As shown in FIG. 2B, since the mobile terminal displays only information 20 of the item corresponding to the category of the menu selected by the user in advance, the user can readily acquire only the information of the desired item.

Whenever a mapping table is updated by a mobile communication service provider, e.g., a mobile carrier, the mobile terminal downloads the updated mapping table for the menu, which is suggested in the present invention, from the mobile communication service provider, updates all changes in a category of a newly desired item, and a price and a stock of the item, and maintains the newest item information. When the mapping table cannot be directly downloaded from the mobile communication service provider, the user can directly update the mapping table through existing infra structure such as the Internet.

The mapping table of the mobile terminal of the present invention can be realized to store only the information related to the item obtained from the filtering in consideration of the limited storage capacity of the mobile terminal.

In the present invention, it is also possible to form an the menu capable of simultaneously reading and displaying information on a plurality of items desired by the user.

FIG. 3 is a flowchart describing a method for selecting only desired item information in the mobile terminal in accordance with an embodiment of the present invention.

A category for a desired item is selected by the user in a menu of the mobile terminal to filter out informations of other categories except the desired item information at step S301. That is, the mobile terminal sets up the category of the item desired and selected by the user in the menu.

The RFID reader of the mobile terminal is operated and reads the item information stored in the tag attached to the item at step S302.

Only the item information on the item selected in the menu among the item informations read by the RFID reader of the mobile terminal is acquired from the filtering and displayed at step S303.

Referring to another embodiment of the present invention, the mobile terminal can be realized to read item information of nearby items and then let the user select a desired item in the menu the read item informations. Subsequently, the mobile terminal selects and displays only the information of the item desired by the user among the acquired item information.

The present invention provides the mapping table for categorizing items in the mobile terminal, prepares the menu for selecting the category of the desired item such as shoes and jeans before operating the RFID reader, and filters and displays only the category of the desired item. Accordingly, the user can easily and efficiently acquire exact and detailed information on the item desired by the user among diverse items. That is, the present invention can raise efficiency of the user and pleasure of the user.

The present application contains subject matter related to Korean patent application Nos. 2005-0095064 and 2005-0123815 filed with the Korean Intellectual Property Office on Oct. 10, 2005, and Dec. 15, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for selecting only desired item information in a mobile terminal, comprising the steps of:
   a) setting up an item category desired and selected by a user in the mobile terminal;
   b) reading item information stored in tags attached to items with a Radio Frequency Identification (RFID) reader loaded in the mobile terminal; and
   c) performing filtering and only displaying the item information of an item from the user selected item category at the mobile terminal,
   wherein the item category set up, which was the desired and selected item category set up by the user in the mobile terminal prior to reading any of the item information stored in the tags, was done before receiving and displaying any of the item information stored in the tags, and
   wherein only the item information of the items, which was read from the information stored in the tags, is displayed according to the desired and selected item category set up by the user in the mobile terminal.

2. The method as recited in claim 1, further comprising selecting an item category in a menu by the user in step a).

3. The method as recited in claim 1, further comprising storing a mapping table mapping item categories to codes in the mobile terminal.

4. A method for selecting only desired item information in a mobile terminal, comprising the steps of:
   a) reading item information stored in tags attached to items with a Radio Frequency Identification (RFID) reader loaded in the mobile terminal;
   b) setting up an item category desired and selected by the user; and
   c) performing filtering and only displaying item information from the user selected item category at the mobile terminal,
   wherein the item category set up, which was the desired and selected item category set up by the user in the mobile terminal prior to reading any of the item information stored in the tags, was done before receiving and displaying any of the item information stored in the tags.

5. The method as recited in claim 4, further comprising selecting an item category from a menu by the user in step b).

6. The method as recited in claim 4, further comprising storing a mapping table mapping item categories to codes in the mobile terminal.

* * * * *